(12) United States Patent
Matsuda et al.

(10) Patent No.: US 6,909,425 B2
(45) Date of Patent: Jun. 21, 2005

(54) TOUCH PANEL

(75) Inventors: Genichi Matsuda, Tokyo (JP); Shozo Furukawa, Tokyo (JP); Makoto Inoue, Tokyo (JP)

(73) Assignee: Fujitsu-Takamisawa Component Ltd., Tokyo (JP)

( * ) Notice: Subject to any disclaimer, the term of this patent is extended or adjusted under 35 U.S.C. 154(b) by 244 days.

(21) Appl. No.: 09/942,733

(22) Filed: Aug. 31, 2001

(65) Prior Publication Data

US 2003/0011575 A1 Jan. 16, 2003

(30) Foreign Application Priority Data

Jan. 17, 2001 (JP) ........................................ 2001-009404

(51) Int. Cl.[7] .................................................. G09G 5/00
(52) U.S. Cl. .................... 345/173; 345/174; 178/18.03; 178/18.05
(58) Field of Search ................................ 345/173–183; 178/18.01–18.11, 19.01–19.07

(56) References Cited

U.S. PATENT DOCUMENTS

| | | | | |
|---|---|---|---|---|
| 4,931,782 A | * | 6/1990 | Jackson | 340/706 |
| 5,349,155 A | * | 9/1994 | Yamagishi et al. | 219/121.71 |
| 5,530,209 A | * | 6/1996 | Watanabe et al. | 178/18 |
| 5,844,175 A | * | 12/1998 | Nakanishi et al. | 178/18.03 |
| 5,943,106 A | * | 8/1999 | Sukenori et al. | 349/39 |
| 5,955,198 A | * | 9/1999 | Hashimoto et al. | 428/414 |
| 6,163,313 A | * | 12/2000 | Aroyan et al. | 345/173 |
| 6,168,910 B1 | * | 1/2001 | Hino et al. | 430/328 |
| 6,356,259 B1 | * | 3/2002 | Maeda et al. | 345/173 |
| 6,507,337 B1 | * | 1/2003 | Sato et al. | 345/173 |
| 6,529,188 B1 | * | 3/2003 | Suzuki | 345/173 |
| 6,721,019 B2 | * | 4/2004 | Kono et al. | 349/12 |

FOREIGN PATENT DOCUMENTS

| | | | |
|---|---|---|---|
| JP | 59-029228 | | 2/1984 |
| JP | 04-14823 | * | 5/1992 |
| JP | 5-127822 | | 5/1993 |
| JP | 08-329767 | * | 12/1996 |
| JP | 9-026584 | | 1/1997 |
| JP | 10-222305 | | 8/1998 |
| JP | 10-260395 | | 9/1998 |
| JP | 11-121780 | | 4/1999 |
| JP | 2000-114555 | | 4/2000 |
| JP | 2000-162594 | | 6/2000 |

* cited by examiner

*Primary Examiner*—Lun-yi Lao
(74) *Attorney, Agent, or Firm*—Staas & Halsey LLP

(57) ABSTRACT

Laser etching is used to form channels which divides a conductive film adhered on a board of a touch panel into a plurality of regions of desired form. A conductive film damage preventing element is attached on the board of the moving-side panel of a pair of panels or the double-faced tape to join them at their perimeters, to prevent damage by the edge of the double-faced tape. A re-usable adhesive layer having 90-degree peel off power of 5 g to 500 g/25 mm is used to adhere optical material on a surface of the panel.

14 Claims, 11 Drawing Sheets

TOUCH PANEL

BACKGROUND OF THE INVENTION

1. Field of the Invention

The present invention relates to a pen-input panel or a touch panel which is used for input to a personal computer, a word processor, an electronic notepad, etc.

2. Description of the Related Art

A resistance film type touch panel which is used by being placed on a display such as an LCD, a PDP, or a CRT is known. This type touch panel includes a pair of panels, each having a transparent conductive film adhered on a transparent board, which are arranged via electrically insulating spacers so that the conductive films are opposed to each other. Circuits are connected to electrodes which are formed on each of the conductive films, and thereby coordinates can be detected by pushing one of the boards by a pen or finger to allow conduction between the upper and lower panels.

The touch panel has being used in large quantities in many fields with the development of electronic equipment and, accordingly, a touch panel capable of being produced more simply and having more durability is strongly required.

For example, for the upper panel and the lower panel of the two transparent panels, a film and a glass, a film and a plastic panel, a film and a film, or the like have been used and, for the conductive film, ITO (indium oxide/tin oxide) or tin oxide ($SnO_2$) is used. However, the conductive film adhered on the board is required to be divided into a desired pattern, and hence prior art touch panels have been formed by eliminating unnecessary portions by etching after adhering a conductive material on the entire surface of the board by sputtering, etc.

For the etching, photolithography methods and sandblast methods have been used. The photolithography methods are classified into, according to etching material, wet methods using a liquid such as aqua regia or hydrochloric acid, and dry methods using a gas such as hydrofluoric acid (HF) or iodinefluoric acid (HI). The wet method requires many processes such as photosensitive resin coating, drying, exposure development by photomasking, and drying, and requires a significant capital investment for liquid control and waste liquid treatment because dangerous liquid such as aqua regia and hydrochloric acid are used. The dry method also requires a significant capital investment for measures against gas leaks, treatment of exhaust gases, etc. because dangerous gases such as hydrofluoric acid and iodinefluoric acid are used.

In addition, there is a method of eliminating unnecessary parts by sandblasting. This method has problems in that much process time is required, many man-hours for management are required due to necessity of frequent exchange of the mask covering the necessary parts, and the strength is reduced due to damage to the board. For this reason, a touch panel having a conductive film divided by a simple operation and entailing a small facility cost is strongly required.

An upper panel and a lower panel of the touch panel can be adhered to each other via a double-faced tape at their perimeters, but they are sometimes damaged by the edge of the double-faced tape when the panel surface is pushed. For this reason, a durable touch panel which does not suffer such damage is required.

In addition, an optical material is often adhered on the surface of the touch panel via an adhesive layer, but these are sometimes peeled off from each other for adhering them again when foreign materials or bubbles enter therebetween during the adhering work. The touch panel and/or the optical material are sometimes damaged, so that they cannot be used again. For this reason, a touch panel having an optical material so adhered thereto that they can be used again after peeling them off from each other.

SUMMARY OF THE INVENTION

It is a main object of the present invention to provide a touch panel wherein a conductive film adhered on a board is divided in a simple manner.

It is another object of the present invention to provide a touch panel wherein a conductive film is not damaged by a double-faced tape.

It is another object of the present invention to provide a touch panel wherein an optical material is adhered thereto so that they can be used again after peeling them off from each other.

According to one aspect of the present invention, there is provided a touch panel including a pair of panels, each having a transparent conductive film adhered on a transparent board, which are arranged via electrically insulating spacers so that the conductive films are opposed to each other, characterized in that the conductive film is divided into a plurality of regions of desired form with the channels formed by laser etching.

Preferably, a plurality of electrode circuits connected to different external conductive wires are provided on the conductive film, and boundary lines are formed with narrow channels so that a plurality of said electrode circuits are not short-circuited.

Preferably, the conductive film is divided into at least the same number of regions as the electrode circuits.

Preferably, closed channels are formed along the periphery so that regions having the electrode circuits are not exposed to the side edge, and thereby short-circuits at the side edge are prevented.

Preferably, wherein the diameter of the laser spot for the etching is 0.1 mm to 2.0 mm.

Preferably, the wavelength of the laser light for the etching is 900 nm or more and is in the infrared ray region.

Preferably, the pulse width of the laser light for the etching is 1 ns or less.

Preferably, a pair of panels are joined at their perimeters via a double-faced tape, and a conductive film damage preventing element, made of an elastic material, to prevent damage, by the edge of the double-faced tape, to the conductive film of the moving-side panel which receives input pressure, is attached to the board of the moving-side panel or the double-faced tape, or further an insulating layer extending to the inside of the edge of the double-faced tape is arranged between the fixed-side panel opposed to the moving-side panel and the double-faced tape, and the conductive film damage preventing element extends to the inside of the edge of the insulation layer.

or further the elastic material is rubber resin.

Preferably, an optical material is adhered, via a reusable adhesive layer, on the surface having no conductive film of one or both of a pair of panels, and 90-degree peel off power of the reusable adhesive layer to the board surface is 5 g to 500 g/25 mm, or further, the main component of the re-usable adhesive layer is any of an ethylene-vinyl alcohol adhesive, a polyacrylester adhesive, a polymethacrylester adhesive or a silicon adhesive, or further, the optical device is any of a polarization board, a circular-polarization board or a phase difference board.

According to one aspect of the present invention, there is provided a touch panel including a pair of panels, each having a transparent conductive film adhered on a transparent board, which are arranged via electrically insulating spacers so that the conductive films are opposed to each other, characterized in that a pair of panels are joined at their perimeters via a double-faced tape, and a conductive film damage preventing element made of elastic material to prevent damage, by the edge of the double-faced tape, to the conductive film of the moving-side panel which receive input pressure, is mounted on the board of the moving-side panel or the double-faced tape.

Preferably, a insulation layer extending to the inside of the edge of the double-faced tape is arranged between the fixed-side panel opposed to the moving-side panel and the double-faced tape, and the conductive film damage preventing element extends to the inside of the edge of the insulation layer.

Preferably, the elastic material is rubber resin.

According to one aspect of the present invention, there is provided a touch panel including a pair of panels, each having a transparent conductive film adhered on a transparent board, which are arranged via electrically insulating spacers so that the conductive films are opposed to each other, characterized in that an optical material is adhered with a re-usable adhesive layer, on the surface having no conductive film of one or both of a pair of panels, and 90-degree peel off power of the re-usable adhesive layer to the board surface is 5 g to 500 g/25 mm.

Preferably, the main component of the re-usable adhesive layer is any of an ethylene-vinyl alcohol adhesive, a polyacrylester adhesive, a polymethacrylester adhesive or a silicon adhesive.

Preferably, the optical device is any of a polarization board, a circular-polarization board or a phase difference board.

The present invention may be more fully understood from the description of preferred embodiments of the invention set forth below, together with the accompanying drawings.

DESCRIPTION OF THE PREFERRED EMBODIMENTS

Referring to the drawings, preferred embodiments of the present invention are described below.

In the following descriptions, the moving-side panel is the board far from the display to be pushed with a pen or finger, and the fixing-side panel is the board near the display, and "front" means "input side", and "back" means "display side".

Figure 1:
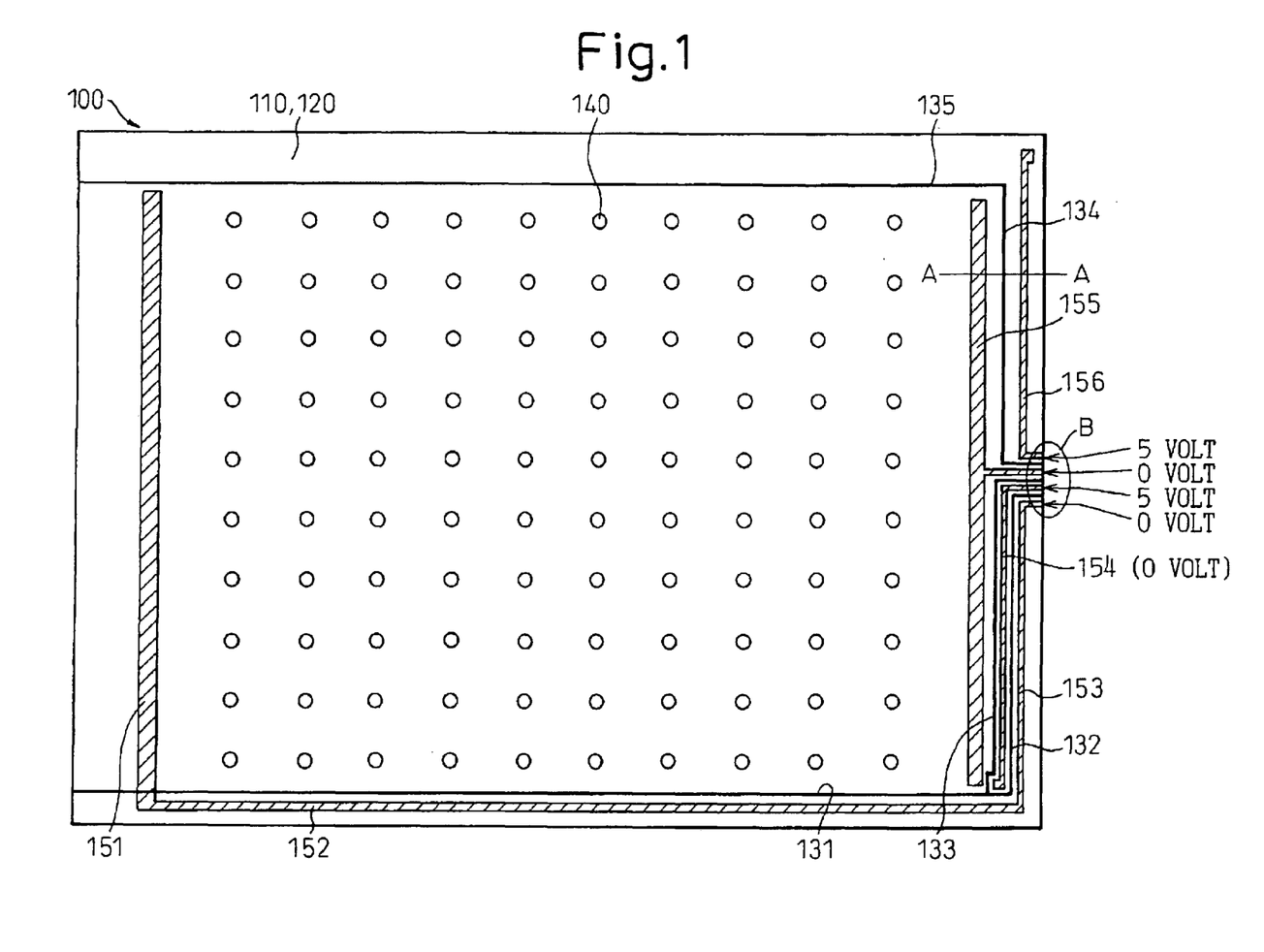
FIG. 1 is a drawing showing the fixing-side panel of the first embodiment of the invention.

FIG. 1 shows a front view of a fixing-side panel 100 for a touch panel of the present invention. The fixing-side panel 100 is formed in the manner that a ITO conductive film 120 (refer to FIG. 4) is attached to the front face of a glass board 110 (refer to FIG. 4) by sputtering, then channels 131, 132, 133, 134, and 135 (shown with thick solid lines) are formed by laser etching, and after that dot spacers 140 are added by screen-printing, and the silver electrode circuits 151, 152, 153, 155, 156, and 156 are added by printing. The channels 131 to 135 are so formed that the region of the conductive film 120 connecting the electrode circuits 151, 152, 153, 154, 155, and 156 is divided as desired.

Figure 2:
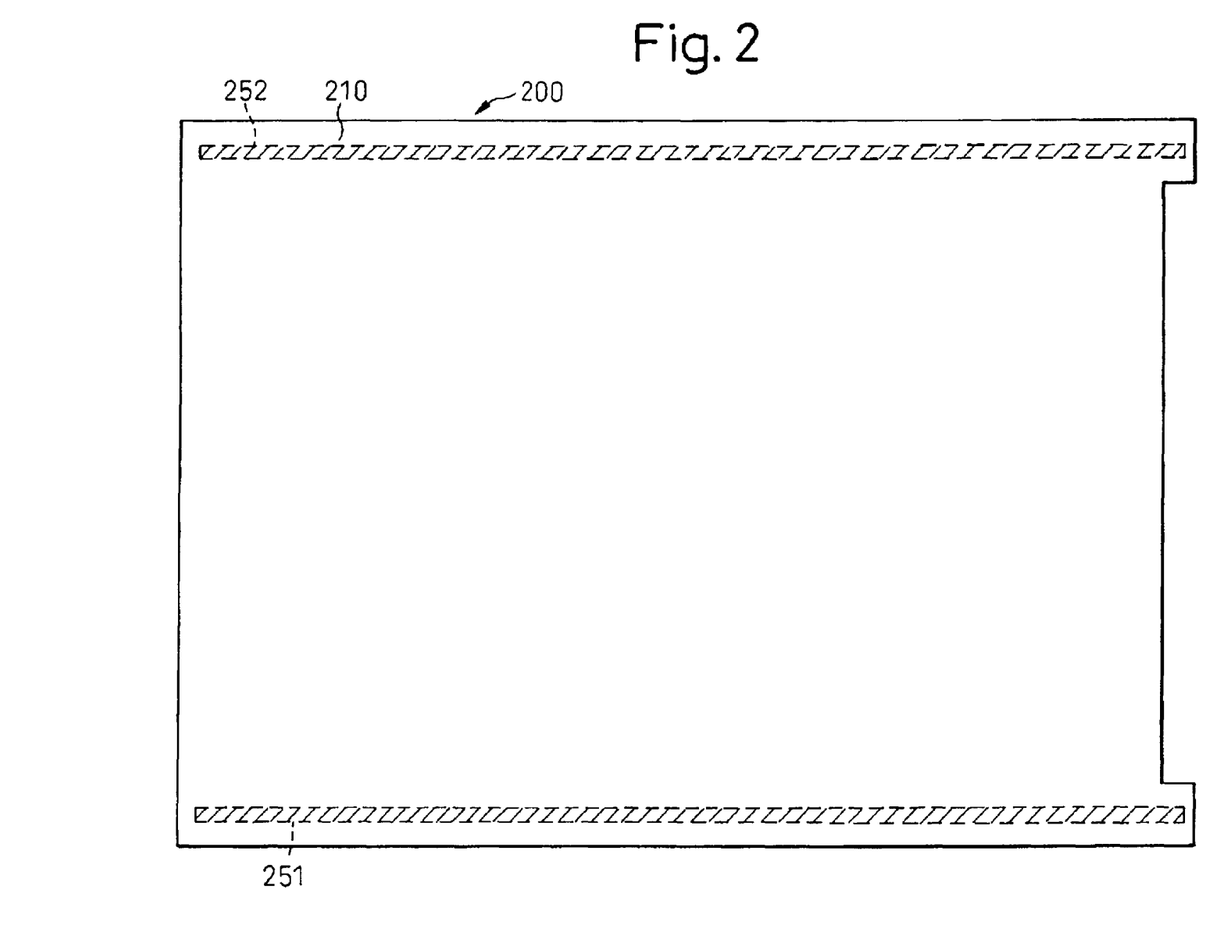
FIG. 2 is a drawing showing the moving-side panel of the first embodiment of the invention.

FIG. 2 is a front view of a moving-side panel which is formed in the manner that a ITO conductive film 220 (refer to FIG. 4) is attached to the back face of a transparent resin film board 210 (refer to FIG. 4) by sputtering, then the silver electrode circuits 251 and 252 are added by printing.

Figure 3:
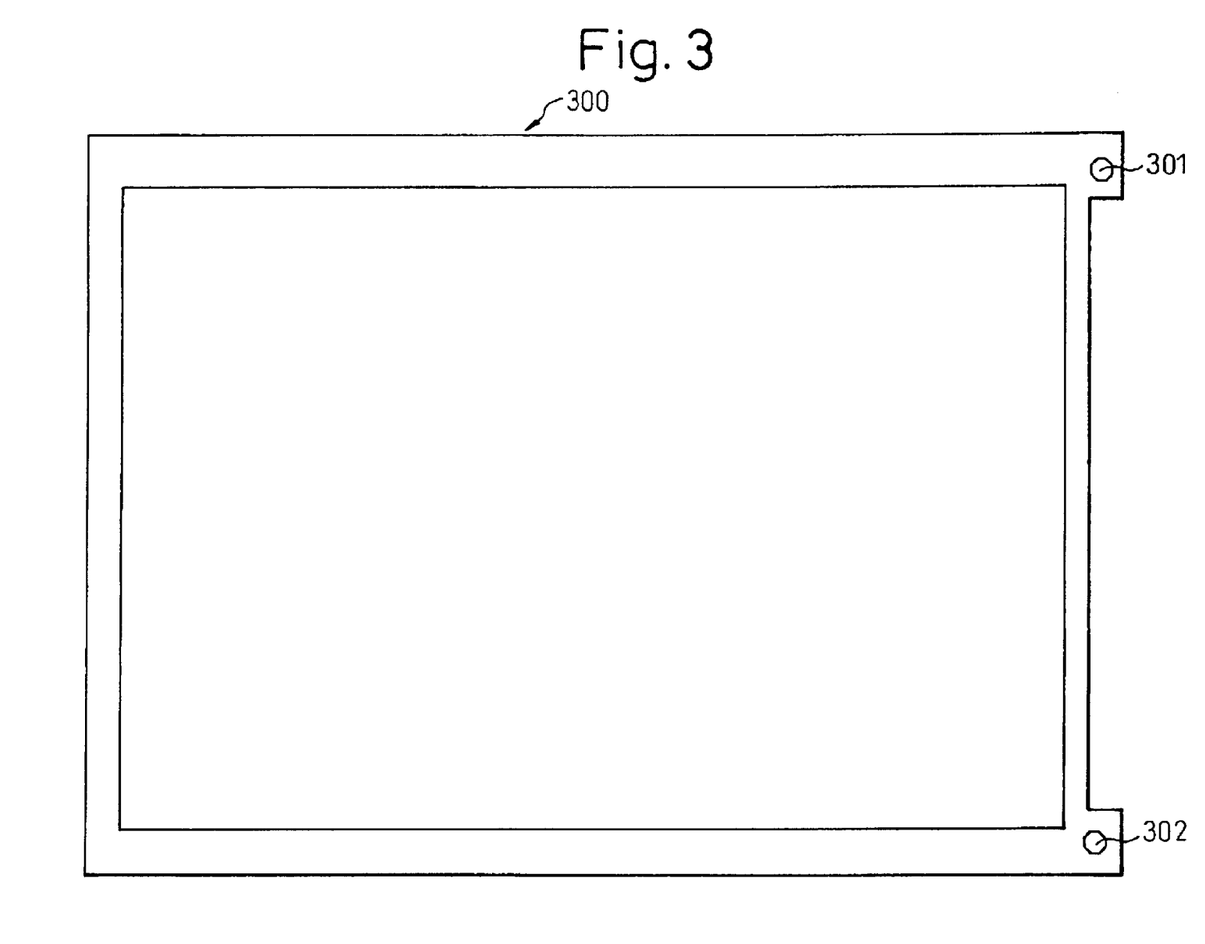
FIG. 3 is a drawing showing the double-faced tape placed between the fixing-side panel and the moving-side panel of the first embodiment of the invention.

FIG. 3 is a front view of a double-faced tape 300 which is placed between the fixing-side panel 100 and the moving-side panel 200, and joins the fixing-side panel 100 and the moving-side panel. The fixing-side panel 100 and the moving-side panel 200 shown in FIGS. 1 and 2 respectively are joined via this double-faced tape 300. Symbols 301 and 302 indicate holes to which conductive adhesive is attached, which allows conductivity between the electrode circuit 156 on the fixing-side panel 100 and the electrode circuit 252 on the moving-side panel 200, and conductivity between the electrode circuits 152, 153 on the fixing-side panel and the electrode circuit 252 on the moving-side panel 200.

Figure 4:
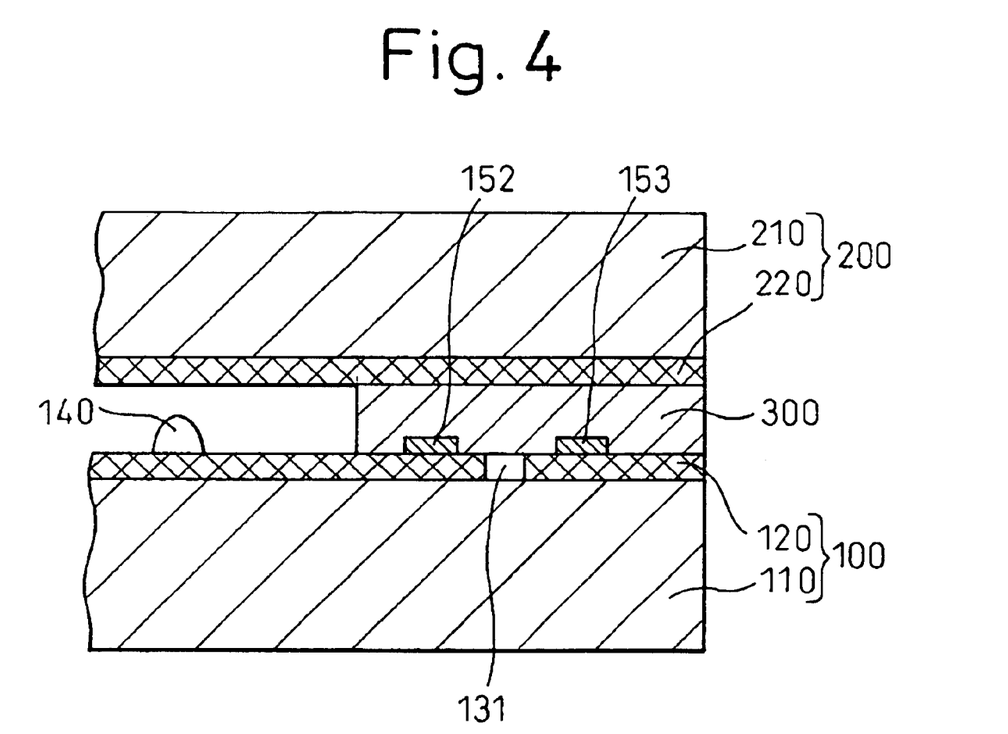
FIG. 4 is A—A section view showing that the fixing-side panel shown in FIG. 1 and the moving-side panel are joined via a double-faced tape, in the first embodiment of the invention.

FIG. 4 is a A—A section view showing that the fixing-side panel 100 in FIG. 1 and the moving-side panel are joined via the double-faced tape 300. The double-faced tape is a thin film both faces of which are coated with adhesive, not shown. The electrode circuits 152 and 153 sunk in the soft adhesive.

In the first embodiment of the invention, the fixing-side panel 100 is formed as stated above, and the conductive film 120 of the fixing-side panel 100 is divided by the channels 131 to 135 formed by a laser, and thereby the touch panel of the first embodiment may be produced in a very short time and simply, and the facility cost for dividing the conductive film is significant low compared to the prior art touch panel produced with a photolithography method because one set of laser devices is enough for this purpose. In addition, the touch panel of the first embodiment may be produced safely because a dangerous liquid or gas is not used, and thereby no man-hours or facility is required for the control and treatment of a dangerous liquid or gas.

In the photolithography method, a photolithographic mask is utilized, and it is necessary to prepare a different photolithographic mask after a modification of division pattern. In the present invention using a laser, the modification of a division pattern requires only modification of the software to control the laser movement, and may be carried out in short time without requiring many man-hours.

Figure 5:
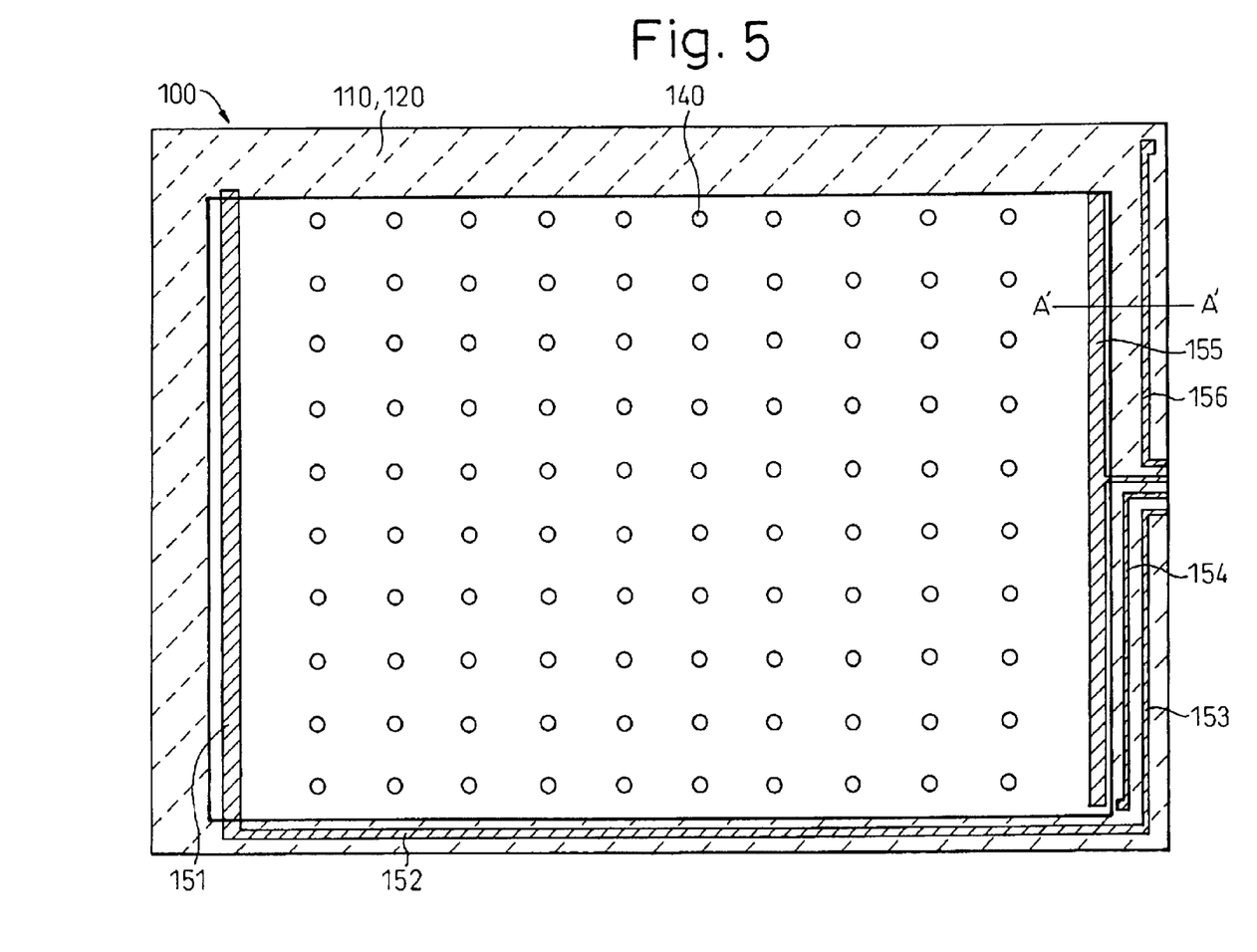
FIG. 5 is a drawing showing the region to be eliminated on the conductive film of the fixing-side panel for a prior art touch panel.
Figure 6:
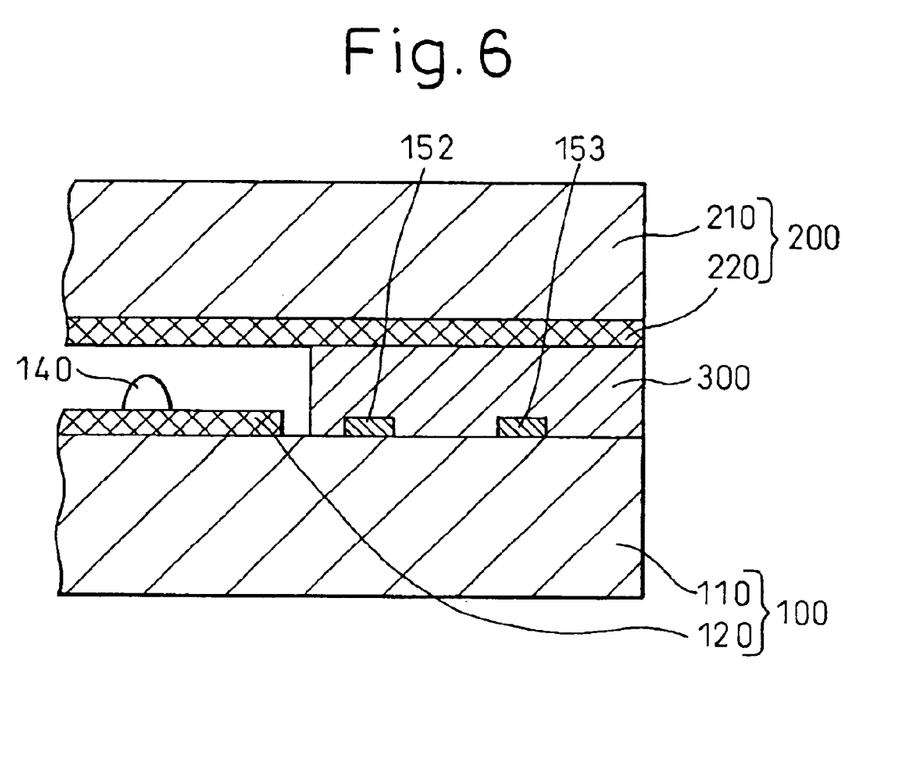
FIG. 6 is A'—A' section view showing that the fixing-side panel wherein the conductive film, eliminated as shown in FIG. 5, is joined to the moving-side panel via a double-faced tape.

In the prior art touch panel, it is not possible to remove the conductive film finely, and thereby it is necessary to remove the conductive film widely as shown in a hatch pattern by dashed lines in FIG. 5, and the fixing-side panel 100 and the moving-side panel 200 are consequently joined as shown in FIG. 6.

For the etching in this embodiment, a YAG laser is used, but a YLF laser, a YVO laser, a CO2 laser, or another laser may also be used. For the laser light, the preferable wave length is 900 nm or more in the infrared ray region, and the preferable pulse width is less than 1 ns, so as not to leave a heat-metamorphic layer in the conductive film. A preferable laser spot diameter is 0.1 mm to 2.0 mm, because a larger spot diameter may form the conductive film 120 more securely but a laser of too large a spot diameter may not allow sharp etching due to energy distribution.

To the fixing-side panel 100 of the touch panel completed as above, a power receiving connector (not shown) is fitted at a position shown by mark B in FIG. 1, and voltages of 0 volt, 5 volt, 0 volt, and 5 volt, for example, are applied to the electrode circuits 153, 154, 155, and 156 respectively. when the front face of the moving-side panel 200 is pushed, the resistance is measured via the electrodes, and coordinates are detected and input to the control device (not shown) as input information. An explanation of the control device is omitted since it has no relation to the present invention.

A variation of the first embodiment is described below. The variation is so configured that the conductive film 120 of the fixing-side panel 100 and the conductive film 220 of the moving-side panel 200 are not shorted at their ends via foreign materials adhered at their ends so as to bridge the conductive film 120 and the conductive film 220 which are extend to the end of the perimeter.

Figure 7:
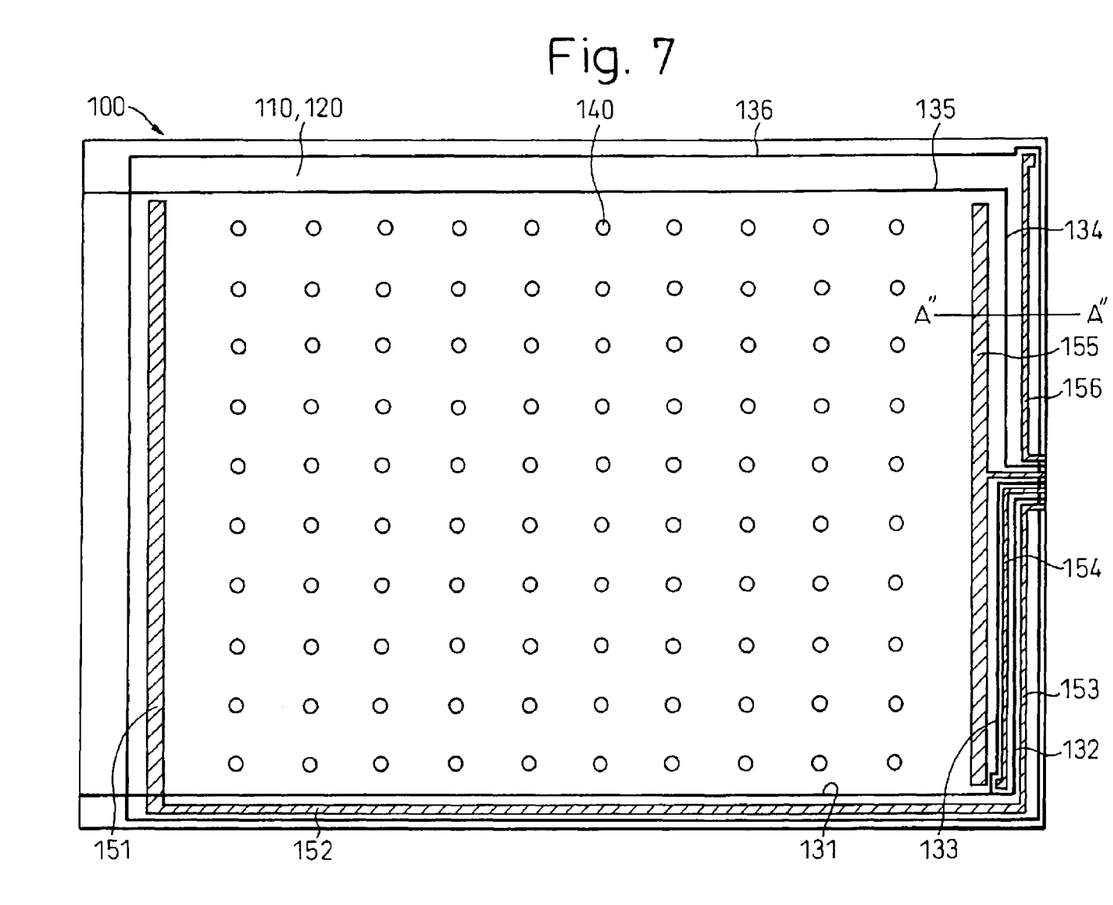
FIG. 7 is a drawing showing the fixing-side panel in the first variation of the first embodiment.
Figure 8:
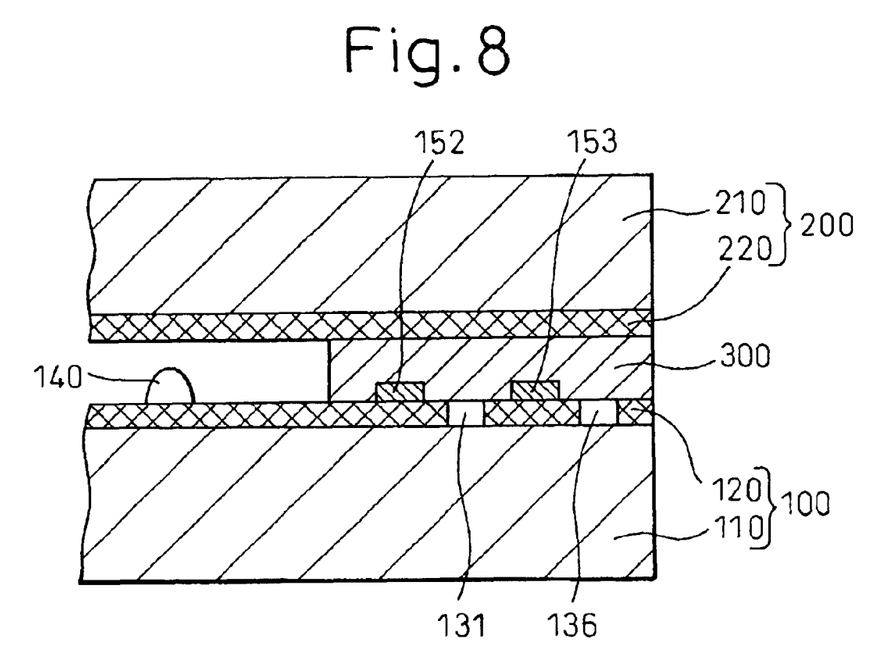
FIG. 8 is A"—A" section view showing that the fixing-side panel, shown in FIG. 7, is joined to the moving-side panel via a double-faced tape.

FIG. 7 is a drawing showing the fixing-side panel 100 of the variation of the first embodiment. A channel 136 close to the perimeter is added to the fixing-side panel of the first embodiment. FIG. 8 is a A"—A" section view of the touch panel shown in FIG. 7. In this touch panel, there is no conductivity between the region including the edge and the region in which power circuits are arranged, and thereby short circuits, as aforementioned, will not arise.

Up to this point, it has been stated that channels made by laser etching are formed on the conductive film 120 adhered on the glass board 110 of the fixing-side panel. Channels made by laser etching may also be formed on a board formed from a film as the board 210 of the moving-side panel.

The second embodiment is described below. The touch panel of the second embodiment is so configured that the conductive film 220 of the moving-side panel 200 is not damaged by the double-faced tape 300. Since the adhesive of the double-faced tape 300 is soft, what damages the moving-side panel is the film (not shown) onto which adhesive is coated.

Figure 9:
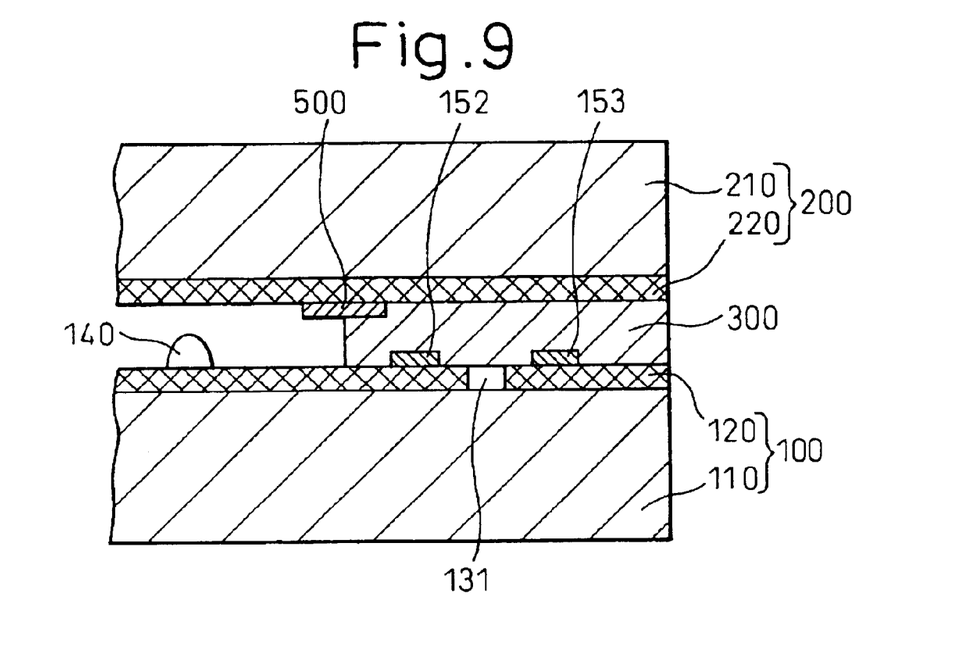
FIG. 9 is a drawing showing an advantage of the second embodiment.

FIG. 9 is a drawing showing an advantage of the second embodiment. A rubber elastic device 500 is attached to the moving-side panel 200 so as to cover the area of the moving-side panel 200 with which an edge of the double-faced tape contacts. Thereby, it may be prevented that the edge of the double-faced tape 300 contacts the conductive film 220 of the moving-side panel 200 and that the conductive film is damaged.

Figure 10:
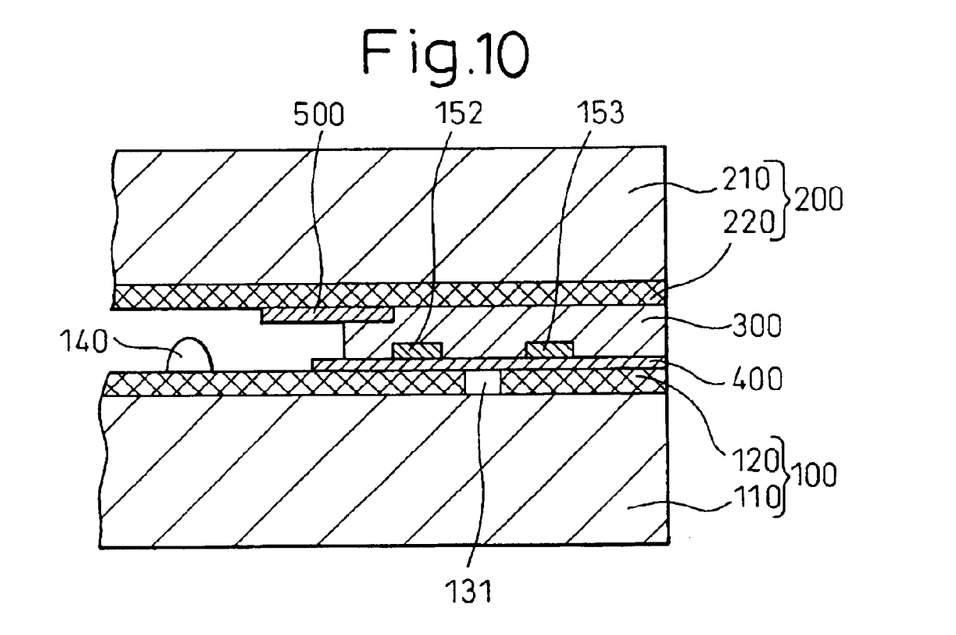
FIG. 10 is a drawing showing an advantage of the first variation of the second embodiment.

FIG. 10 is a drawing showing the first variation of the second embodiment, wherein a insulation layer 400 is provided between the fixing-side panel 100 and the double-faced tape 300, and the elastic device 500 extends inside, and thereby it may be prevented that the edge of the insulation layer 400 contacts the conductive film 220 of the moving-side panel.

Figure 11:
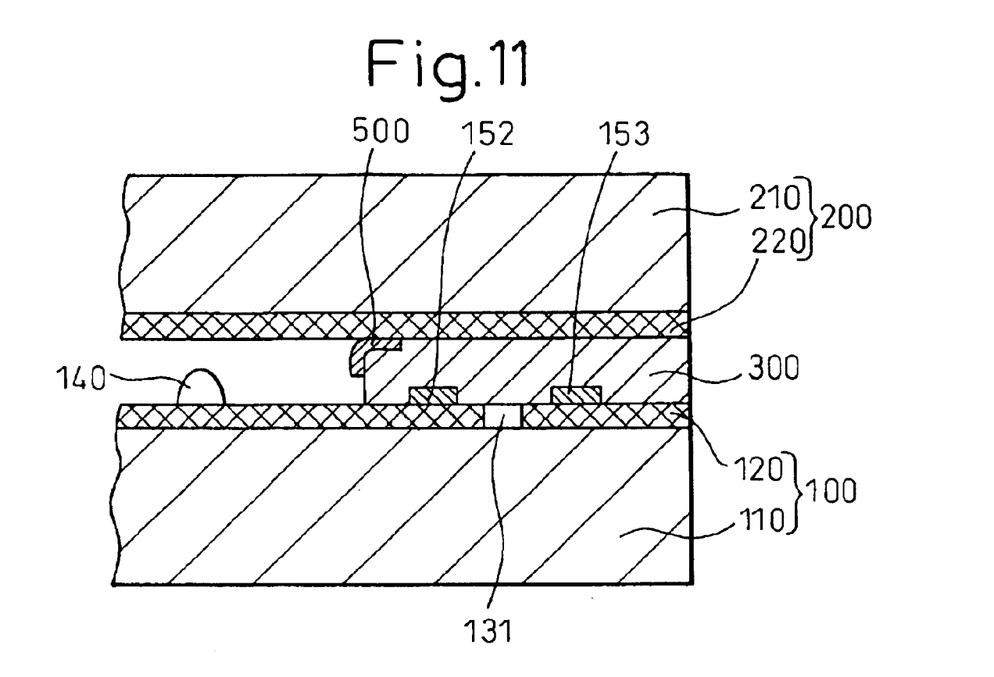
FIG. 11 is a drawing showing an advantage of the second variation of the second embodiment.
Figure 12:
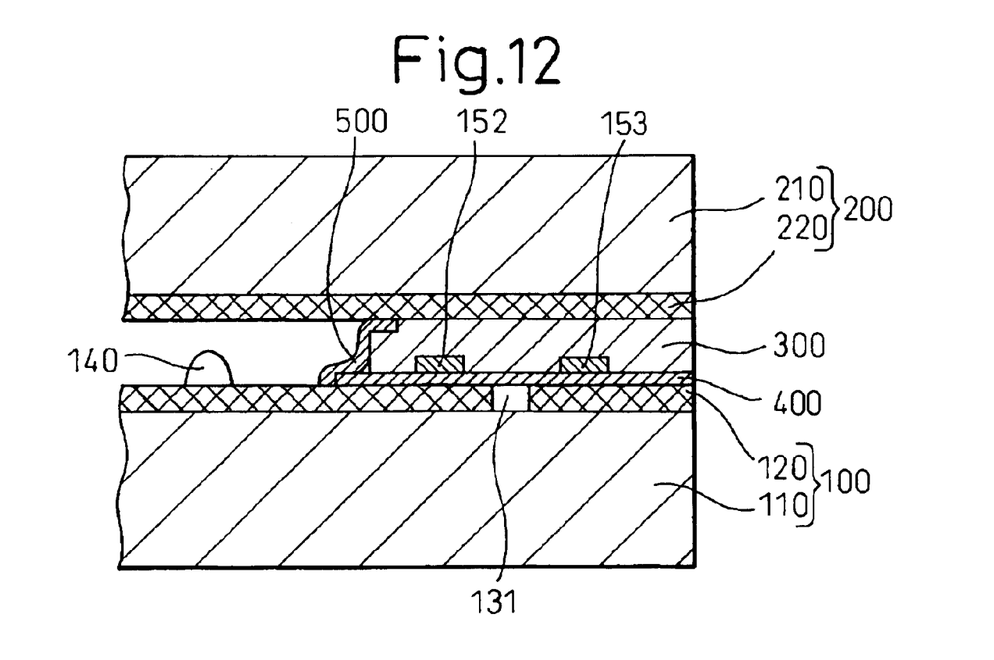
FIG. 12 is a drawing showing an advantage of the third variation of the second embodiment.

FIG. 11 is a drawing showing a second variation of the second embodiment, wherein a elastic device 500 is not fitted on the moving-side panel 200 but is fitted on the double-faced tape 300. FIG. 12 is a drawing showing the third variation of the second embodiment, wherein the insulation layer 400 is provided and a elastic device 500 is fitted on the double-faced tape 300. As described above, the elasticity device not attached on the moving-side panel 200 but attached on the double-faced tape 300 may also prevent damage to the conductive film 220.

In the second embodiment and its variations, the conductive film is divided by the channels formed by laser etching as the first embodiment. However, since the advantage of the second embodiment is its configuration as mentioned above, it is understood easily that the second embodiment is not limited to case that the conductive film is divided by laser etching as the first embodiment, but may also be applied to the case that the conductive film is divided by the method such as a photolithography method and a sandblast method as in the prior art touch panel.

Before descriptions of the third embodiment, the background is explained in detail.

In order to prevent reflection at the surface of a touch panel and improve visibility of the touch panel, an optical device such as a polarization board, a phase difference board, and a circular polarization board is often adhered on the front face of a moving-side panel 200 or the back face of a fixing-side panel 100. During this adhering work, foreign materials or bubbles may enter, and in such a case the optical device is sometimes removed to repeat the adhering work. If adhesive power of the adhesive layer is inadequate, residue may be present on the surface of the optical device, the moving-side panel 200, or the fixing-side panel 100, and thereby the optical device, the moving-side panel 200, or the fixing-side panel 100 may be damaged when removing the optical device, which may not allow the reuse and result in a low yield.

The third embodiment of the present invention provides solutions to such problems, wherein the adhesive layer is a re-exfoliative adhesive layer having adequate adhesive power which may not cause the problems described above.

Figure 13:
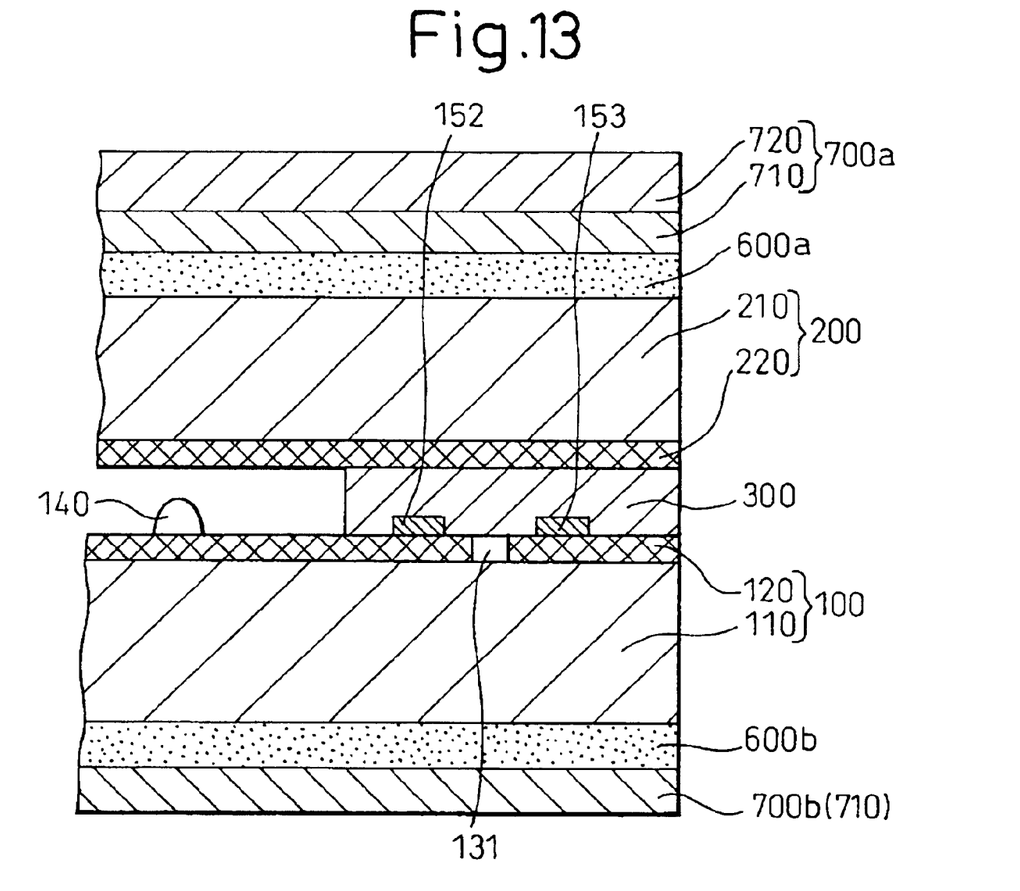
FIG. 13 is a drawing showing the third embodiment.

FIG. 13 is a section view of a touch panel of the third embodiment, wherein an optical device 700a consisting of a quarter wave length board 710 and a polarization board 720 is adhered on the front face of the moving-side panel 200 via a re-exfoliative adhesive layer 600a, and an optical device 700b comprising a quarter wave length board 710 is adhered on the back face of a fixing-side panel via a re-exfoliative adhesive layer 600b.

The adhesive layer 600a has 90-degree exfoliation adhesive power of 5 g to 500 g/25 mm to a resin film board 210 of the moving-side panel 200. The adhesive layer 600b has 90-degree peel off power of 5 g to 500 g/25 mm to a glass board 110 of the fixing-side panel 100. A 90-degree peel off power of 500 g/25 mm means that the power necessary for pulling a 25 mm width tape in a direction at right angles to the adhesive face to remove it is 500 g.

It is preferable that the re-usable adhesive layer is formed by an adhesive the main component of which is any of an ethylene-vinyl alcohol adhesive, a polyacrylester adhesive, a polymethacrylester adhesive and a silicon adhesive, and that the re-usable adhesive layer has transmittance of 75% or more in the visible light region (JIS Z 8722).

The re-usable adhesive layer as mentioned above may prevent damage to the optical material 700a, 700b, the moving-side panel 200 and the fixing-side panel during removing work, and prevent and of the adhesive to remain, and the yield may be improved accordingly.

In the third embodiment described above, the conductive film is divided by the channels formed by laser etching as the first embodiment. However, since the advantage of the third embodiment is its configuration as mentioned above, it is understood easily that the third embodiment is not limited to a case where the conductive film is divided by laser etching as the first embodiment, but may also be applied to the case that the conductive film is divided by the method such as a photolithography method and a sandblast method as in the prior art touch panel.

What is claimed is:

1. A touch panel comprising:

electrically insulating spacers;

a double-faced tape;

a pair of relatively fixed and moveable panels, the moveable panel being moveable in response to pressure applied thereto and each panel having a transparent conductive film adhered on a transparent board, the panels being arranged via the electrically insulating spacers so that the respective transparent conductive films of the pair of panels are opposed to each other, one of the transparent conductive films being divided into a plurality of regions of desired forms by channels formed by laser etching, and the pair of panels being joined at respective perimeters thereof via the double-faced tape; and a conductive film damage preventing element made of an elastic material mounted on at least one of the panel and the double-faced tape, so as to cover an area of the transparent conductive film on the movable panel otherwise subject to potentially damaging contact by an edge of the double-faced tape.

2. The touch panel of claim 1, wherein a plurality of electrode circuits connected to different external conductive wires are provided on the one conductive film, and boundary lines are formed with narrow channels so that said plurality of electrode circuits are not short-circuited.

3. The touch panel of claim 2, wherein the one conductive film is divided at least into a same number of the regions as the electrode circuits.

4. The touch panel of claim 2, wherein closed channels are formed near a periphery so that the regions having the electrode circuits are not exposed at a side edge.

5. The touch panel of claim 1, wherein a diameter of a laser spot for the laser etching is 0.1 mm to 2.0 mm.

6. The touch panel of claim 1, wherein laser light for the laser etching is an infrared ray with a wavelength of 900 nm or more.

7. The touch panel of claim 1, wherein a pulse width of laser light for the laser etching is 1 ns or less.

8. The touch panel of claim 1, further comprising:

an insulation layer arranged between the fixed panel and the double-faced tape and extending beyond an inside edge of the double-spaced tape; and the conductive film damage preventing element extending beyond an inside edge of the insulation layer so as to cover an area of the transparent conductive film on the movable panel otherwise subject to potentially damaging contact by the inside edge of the insulation layer.

9. The touch panel of claim 1, wherein the elastic material is rubber resin.

10. A touch panel comprising:

electrically insulating spacers;

a double-faced tape;

a pair of relatively fixed and moveable panels, the moveable panel being moveable in response to pressure applied thereto and each panel having a transparent conductive film adhered on a transparent board, the panels being arranged via the electrically insulating spacers so that the respective transparent conductive films of the pair of panels are opposed to each other, the pair of panels being joined at respective perimeters thereof via the double-faced tape; and a conductive film damage preventing element made of an elastic material mounted on at least one of the panel and the double-faced tape, so as to cover an area of the transparent conductive film on the movable panel otherwise subject to potentially damaging contact by an edge of the double-faced tape.

11. The touch panel of claim 10, further comprising:

an insulation layer arranged between the fixed panel and the double-faced tape; and the conductive film damage preventing element extending beyond an inside edge of the insulation layer.

12. The touch panel of claim 10, wherein the elastic material is rubber resin.

13. A touch panel, comprising:

a double-faced tape;

a pair of fixed and relatively movable panels, each having a transparent conductive film provided on a corresponding transparent board so that the respective transparent conductive films of the pair of panels are opposed to each other and spaced apart, the pair of panels being coupled at respective perimeters thereof via the double-faced tape; and a film shielding unit mounted on the double-faced tape and having a first portion disposed between the double faced tape and the transparent conductive film of the moveable panel and a second portion extending inwardly relatively to an inner edge of the double-faced tape, so as to cover an area of the transparent conductive film on the movable panel otherwise subject to potentially damaging contact by the inner edge of the double-faced tape.

14. A touch panel having a pair of panels with respective transparent conductive films thereon, the panels being spaced apart and coupled together by a double-faced tape disposed on and extending between the respective perimeters of the pair of panels, one of the panels being moveable in response to input pressure thereon indicating a location on the one of said panels, comprising:

a shielding unit provided adjacent an inner edge of the double-faced tape and having a portion disposed between the moveable panel and the respective transparent conductive film, so as to cover an area of the transparent conductive film on the movable panel otherwise subject to potentially damaging contact by the inner edge of the double-faced tape.

* * * * *

UNITED STATES PATENT AND TRADEMARK OFFICE
CERTIFICATE OF CORRECTION

PATENT NO. : 6,909,425 B2
DATED : June 21, 2005
INVENTOR(S) : Genichi Matsuda et al.

It is certified that error appears in the above-identified patent and that said Letters Patent is hereby corrected as shown below:

Title page,
Item [73], Assignee, change "Fujitsu-Takamisawa" to -- Fujitsu Takamisawa --.

Column 7,
Lines 26-27, change "moveable" to -- movable --.

Signed and Sealed this

Twenty-first Day of March, 2006

JON W. DUDAS
*Director of the United States Patent and Trademark Office*